United States Patent
Smith (10) Patent No.: US 9,024,894 B1
(45) Date of Patent: May 5, 2015

(54) REMOTE CONTROL INCLUDING TOUCH-SENSING SURFACE

(75) Inventor: Robert Todd Smith, Boulder, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 99 days.

(21) Appl. No.: 13/598,111

(22) Filed: Aug. 29, 2012

(51) Int. Cl.
*G06F 3/033* (2013.01)
*H04N 21/422* (2011.01)

(52) U.S. Cl.
CPC .................................. *H04N 21/422* (2013.01)

(58) Field of Classification Search
CPC ............. H04N 5/4403; H04N 2005/4428; H04N 21/42204; H04N 21/42207; H04N 21/42209; H04N 21/4221; H04N 21/4222; H04N 21/64322; H04N 2005/443; H04N 21/40; G06F 3/0488; G06F 3/048; G06F 3/04883; G06F 3/0482; G06F 3/03547
USPC ................. 345/156–174; 348/734; 725/39; 715/863
See application file for complete search history.

(56) References Cited

U.S. PATENT DOCUMENTS

| | | | |
|---|---|---|---|
| 6,407,779 B1 * | 6/2002 | Herz | 348/734 |
| 2005/0052427 A1 * | 3/2005 | Wu et al. | 345/173 |
| 2009/0153288 A1 * | 6/2009 | Hope et al. | 340/3.1 |
| 2010/0169842 A1 * | 7/2010 | Migos | 725/863 |
| 2010/0238109 A1 * | 9/2010 | Cook et al. | 345/156 |
| 2012/0057081 A1 * | 3/2012 | Petersson et al. | 348/734 |
| 2012/0062604 A1 * | 3/2012 | Lobo et al. | 345/684 |
| 2012/0081299 A1 * | 4/2012 | Xiao et al. | 345/173 |
| 2012/0185801 A1 * | 7/2012 | Madonna et al. | 715/834 |
| 2012/0280901 A1 * | 11/2012 | Kim | 345/156 |

FOREIGN PATENT DOCUMENTS

WO    WO 2012104288 A1 *  8/2012

* cited by examiner

*Primary Examiner* — Vijay Shankar
*Assistant Examiner* — Abhishek Sarma
(74) *Attorney, Agent, or Firm* — Chapin IP Law, LLC (57) ABSTRACT

As discussed herein according to one configuration, a remote controller device includes a touch-sensing surface, touch processing logic, and a communication interface. The touch-sensing surface includes an array of sensors to detect a gesture inputted by a subscriber indicating how to control settings of a content management device. The touch processing logic processes the detected gesture and converts the detected gesture into control information. The communication interface of the remote controller device transmits the control information over a communication link to control settings of the content management device. Gesture-based remote control as discussed herein provides more advanced control compared to conventional button-type remote control techniques.

10 Claims, 8 Drawing Sheets

REMOTE CONTROL INCLUDING TOUCH-SENSING SURFACE

BACKGROUND

Conventional remote control techniques enable a respective user to control a playback device from a distance. For example, a conventional remote control device typically includes many selectable buttons. In response to pressing of a respective button, control logic in the conventional remote control device produces a corresponding digital sequence of control information. Via an infrared transducer disposed at an end of the remote control device, the remote control device outputs the sequence of control information on an infrared carrier signal to a target device. Typically, the target device being controlled is in the same room as the person operating the remote controller.

The target device receives and decodes the infrared carrier signal to reproduce the digital sequence of control data. The target device then executes a respective command represented by the control data. Accordingly, via pressing of one or more buttons on a remote control device, a user is able to remotely control a target device.

The conventional technique of remotely controlling a device can be used in any number of different applications in a home network environment. For example, the remote control device can be used to control a DVD player, set-top box, television, stereo, etc.

In accordance with one conventional application, a home network can include a cable set-top box to receive different channels of content in a cable network environment. Via selection of one or more buttons and respective transmission of one more commands from the remote control device, the subscriber is able to remotely control the set-top box and play back desired content on a display screen.

BRIEF DESCRIPTION OF EMBODIMENTS

Conventional button-based techniques for remotely controlling one or more playback devices suffer from a number of deficiencies. For example, conventional handheld remote control devices are limited to controlling a target device via pressing of one or more buttons disposed on a face of the remote control device. In such an instance, the user is limited to single presses of specific buttons on the remote controller device to control the playback device.

Embodiments herein deviate with respect to conventional techniques. For example, one embodiment herein is directed to a novel manner of controlling playback of content.

More specifically, according to one embodiment, a remote controller device includes a touch-sensing surface. The touch-sensing surface includes an array of sensors to detect one or more gestures by a subscriber or user indicating how to control settings of a content management device. Touch processing logic in the remote controller device processes input to the touch-sensing surface to detect an event such as occurrence of a gesture. The touch-processing logic converts the detected gesture into control information. A communication interface of the remote controller device transmits the control information (capturing the detected gesture) over a communication link to remotely control a content management device.

The gesture of the user can be any suitable type of input. For example, the gesture by the user can be one or more swipes, pinches, taps, etc., inputted to the touch-sensing surface. In one embodiment, a swipe can be continuous movement and touching of an object across the touch-sensing surface. The one or more gestures can be performed using any suitable object such as a finger, stylus, etc.

In one embodiment, the touch processing logic produces control information specifying a sequence of sensors in the array that sense the swipe. In addition or as an alternative to being one or more swipes, note that the detected gestures also can include one or more momentary touches of a specific region (or regions) of the touch-sensing surface, etc.

By way of a non-limiting example, the control information produced by the touch-processing logic can specify timing and/or durations of the one or more touches as well as the specific regions of the touch-sensing surface that sensed the input. In one embodiment, different gestures inputted by a respective user can correspond to different types of control commands.

In accordance with further embodiments, the touch-sensing surface can be a gesture-detection interface including a display on which to receive touch-screen control input from the subscriber. As previously discussed, the gesture of the subscriber (e.g., user) can include physical sweeping contact inputted to the touch-sensing surface. The touch processing logic can be configured to produce control information including details such as specific attributes (e.g., timing, location, etc.) of the physical sweeping contact inputted to the touch-screen.

In addition to being configured to receive control input from a respective user, the communication interface of the remote controller device can be configured to receive state information indicating a state of the display device controlled by the content management device. For example, as previously discussed, the touch-sensing surface can be a touch screen display device. The touch processing logic can be configured to process the state information and display a respective state of the display device (or suitable graphical user interface for controlling the display device) on the touch-sensing surface.

In one non-limiting example embodiment, the touch processing logic initiates display of a respective control interface (e.g., graphical user interface) on a touch screen to enable the subscriber to control the content management device. A configuration of the respective control interface visually displayed on the touch screen can vary depending on the state of the display device. Thus, in accordance with one embodiment, if desired, the touch-sensing surface can be configured to display a current state of the display device as well as, or alternatively, different options for controlling the content management device and/or display device.

In a further embodiment, a gesture detected by the remote controller device can indicate selection of one or more commands displayed on the display device. For example, the content management device (controlled via the input of the remote controller device) can initiate display of a guide (e.g., graphical user interface) including one or more control options that are selectable by a subscriber viewing the display device. Via input such as one or more gestures to the touch-sensing surface of the remote controller device, the user can select from a displayed list of one or more control options on the display device. Thus, the touch-sensing surface of the remote controller device can be used to select commands displayed on a remote display screen.

In alternative embodiments, the touch-sensing surface of the remote controller device may not be populated with any selectable symbols to control the content management device. As a non-limiting example, the touch-sensing surface can be a substantially blank display screen. The touch processing logic can be configured to receive the touch-input and include input indicating selection of a currently displayed command (on the display device controlled by the content management device) in the control information.

By way of a non-limiting example, the content management device can be a set-top box located in a subscriber domain of a shared cable network environment. The control information can specify a command (via one or more gestures) directed to the content management device to play back selected content as specified by a user operating the remote controller device. In accordance with the control information, the content management device streams the selected content to a display device in a subscriber domain (in which the user resides) of the cable network environment. In one embodiment, the user of the remote controller device provides input to the touch-sensing surface of the remote controller device to indicate which of multiple available channels the content management device is to tune and playback on the display device.

Further embodiments herein can include establishing a first communication session between the remote controller device (in the subscriber domain or external to the subscriber domain) and a remote server over a network. The remote controller device forwards the control information over the communication session to the remote server to control a content management device in the subscriber domain. The content management device can be configured to establish a second communication session with the remote server to retrieve the control information generated by the remote controller device. Thus, in one embodiment, the remote controller device transmits the control information to the remote server. The content management device initiates retrieval of the control information from the remote server. The communication sessions can be secured connections.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate remote control of a remotely located content management device. The instructions, when executed by a processor of a respective computer device, cause the processor or multiple processors of the system to: based on activation of multiple sensors in a touch-sensing surface, detect a gesture inputted by a subscriber indicating how to control settings of a content management device; convert the detected gesture into control information; and transmit the control information over a communication link to control settings of the content management device, the content management device configured to stream selected content to a display device in accordance with the control information.

Yet another embodiments herein includes a computer readable storage medium and/or system having instructions stored thereon to remotely control a content management device. The instructions, when executed by a respective computer device, cause a processor or multiple processors to: establish a communication session between a remote controller device in a subscriber domain and a remote server over a network; receive control information from the remote controller device operated in the subscriber domain, the control information indicating a gesture sensed by a touch-sensing surface of the remote controller device; and forward the control information over the communication session to the remote server to control a content management device in the subscriber domain.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of remotely controlling a content management device or display device in a cable network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
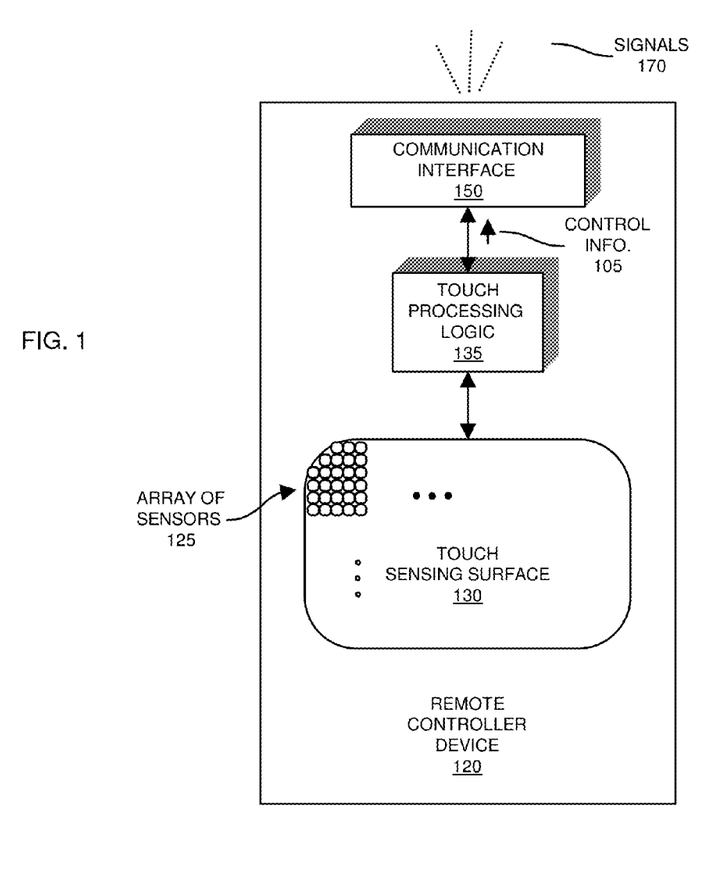
FIG. 1 is an example diagram illustrating a remote controller device according to embodiments herein.

Now, more specifically, FIG. 1 is an example diagram illustrating a remote controller device according to embodiments herein.

As shown, according to one embodiment, the remote controller device 120 includes a touch-sensing surface 130. The touch-sensing surface includes an array of sensors 125 to detect input from a user indicating how to control settings of a target device. Via activation (based on touching) of one or more sensors in the array of sensors 125, the touch-sensing surface 135 detects different touch events such as a user touching a specific location, swiping of a finger across the touch-sensing surface 130, etc.

Remote controller device 120 can include touch-processing logic 135. Touch processing logic 135 processes a gesture inputted to the touch-sensing surface 130 and converts the detected gesture into corresponding control information 105 describing the input. The control information 105 can include information in any suitable format indicating which of the sensors are activated at different times.

As an example, the touch-processing logic 135 can be configured to monitor each sensor in the array of sensors 125. By way of a non-limiting example, the touch-processing logic 135 can be a web application. The remote controller device 120 can be any type of device such as an iPhone™, iPad™, Android™, etc.

Assume in this example that the sensors are not activated until a respective object such as a finger, stylus, etc., touches a corresponding surface where the sensor resides on the surface. Each respective sensor in the array becomes activated when touched by a respective object. Touch-processing logic 135 keeps track of when and which of the respective sensors are activated over time.

In one embodiment, the control information 105 produced by the touch-processing logic 135 indicates which of the sensors and when the different sensors are activated. By way of a non-limiting example, the control information 105 can represent the raw data outputted by the sensors representing different types of gestures (e.g., swipes, pinches, taps, double taps, etc.)

As mentioned, the control information 105 captures different types of inputs to the touch-sensing surface 130. For example, in one embodiment, a user operating the remote controller device 120 can tap, double tap, etc., on a particular region of the touch-sensing surface 130. In such an instance, the control information 105 as produced by the touch-processing logic 135 records the activation of a respective location of the one or more taps as well as a time of each tap such as when respective sensors in the array are activated.

In accordance with another embodiment, a user operating the remote controller device 120 can swipe his finger across the touch-sensing surface 130. In such an instance, the control information 105 as produced by the touch-processing logic 135 records the sequence of activated sensors (representing the swipe) in the array that have been touched. Based on a location of the activated sensors as well as timing of activation, it is possible to determine a direction of a swipe, speed of a swipe, etc.

As shown, the remote controller device 120 can further include a communication interface 150. The communication interface 150 of the remote controller device 120 transmits the control information 105 over a communication medium (e.g., a wireless medium, wired medium, etc.) to control a target device. In one embodiment, the communication interface 150 transmits an encoded version of the control information 105 as signals 170.

As further discussed herein in the following figures, the remote controller device 120 can be configured to communicate the control information to a remote server over a network. A target device (to which the control information is intended to control) can be configured to retrieve the control information from the remote server. In one embodiment, the communication interface 150 communicates over a WiFi connection to the remote server.

In accordance with further embodiments, the remote controller device 120 can be an iPod™ or iPad™. One tends to use different fingers to input gesture commands when using an iPod™ versus an iPad™. On the iPod™, the thumb is most easily used as it works in a one-handed configuration. On an iPad™, it is typically easier to use other fingers. Depending on whether the user uses a thumb or fingers to input gesture commands, the command gestures may feel different.

One embodiment herein includes the ability to calibrate the gestures depending on what touch device and touch-sensing surface 130 is used to detect input gestures. For example, a thumb has less mobility than a finger so a swipe gesture in a particular direction might be quantified as moving 20 pixels on an iPod™. With a finger (such as an index finger) and its greater mobility along with a larger sized sensing surface the remote controller device 120, the gesture might be quantified as 30 pixels on an iPad™.

Figure 2:
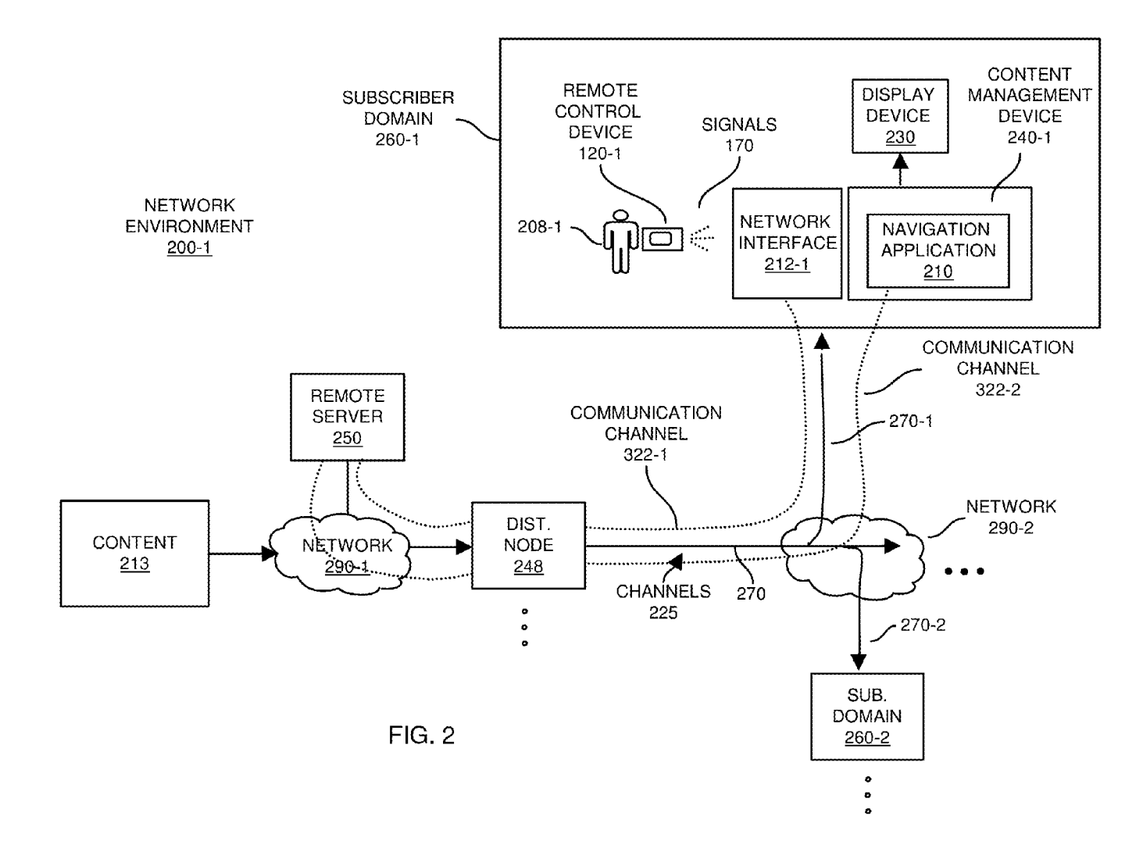
FIG. 2 is an example diagram illustrating of a network environment in which a user operates a remote controller device to control a content management device according to embodiments herein.

FIG. 2 is an example diagram illustrating of a network environment in which a user operates a remote controller device to control operation of a target device according to embodiments herein.

More specifically, by way of a non-limiting example, network environment 200-1 can be a shared cable network in which content 213 is delivered over multiple channels 225 to one or more subscriber domains 260 (e.g., subscriber domain 260-1, subscriber domain 260-2, etc.).

Each of the subscriber domains 260 can include one or more content management device (e.g., set-top box, personal computer, iPad™, etc.) that selectively tunes to one or more of the multiple channels 225 to store and/or play back respective content 213.

In this non-limiting example, the distribution node 248 receives multiple channels 225 of content 213 as transmitted over network 290-1. The content 213 can be encoded in accordance with one or more different streaming protocols. As its name suggests, the distribution node 248 transmits the multiple channels 225 of content 213 over shared communication link 270 (e.g., a coaxial cable, fiber, etc.). Terminal ends of shared communication link 270 branch off into each subscriber domain 260 via communication link 270-1, communication link 270-2, etc.

In one embodiment, communication link (or links) include channels 225 and/or communication channels 322 (e.g., communication channel 322-1 and communication channel 322-2). By way of a non-limiting example, the communication channels 322 can be web-based channels established in accordance with the DOCSIS (Data Over Cable Service Interface Specification) standard.

Thus, in one embodiment, the communication link 270 represents a shared communication media. The combination of subscriber domains 260 and corresponding subscribers therein having access to shared communication link 270 can represent a service group. In other words, the subscriber domains 260 can represent a service group of subscribers a common set of encoded signals, although the different subscribers may have different access privileges with respect to decoding of the available channels 225.

In accordance with further embodiments, note that the network 290-2 and corresponding communication links can include any suitable media such as wireless links, fibers, coaxial cable, twisted pair wire, etc.

In this non-limiting example embodiment, the subscriber domain 260-1 includes user 208-1 (e.g., a cable network subscriber), a remote controller device 120-1, a network interface 212-1, a content management device 240-1 (e.g., set-top box, personal computer, iPad™, etc.), and one or more display devices such as display device 230 (i.e., playback device).

The content management device 240-1 is coupled to communication link 270-1 of network to receive channels 225 of content 213. The content 213 can be any suitable type of media (e.g., audio, video, streaming data, linear television programs, video on demand, IP television, etc.).

Via input from the user 208-1, the content management device 240-1 can be selectively tuned amongst the multiple available channels 225 to play back selected streaming content on display device 230 located in subscriber domain 260-1.

Note that the content management device 240-1 may be one of multiple content management devices located in the subscriber domain 260-1. Display device 230 may be one of multiple display devices in the subscriber domain 260-1. Each of subscriber domains 260 can be configured in a similar manner.

As previously discussed in FIG. 1, the remote controller device 120-1 can include a respective touch-sensing surface (or touch display screen) to receive touch-screen input from user 208-1 in the subscriber domain 260-1. The touch-screen input as sensed by touch-processing logic 135 indicates how to control settings of the content management device 240-1.

In one embodiment, referring again to FIG. 2, the remote controller device 120-1 executes a remote control application that establishes communication channel 322-1 between the remote controller device 120-1 and the remote server 250. By way of a non-limiting example, the communication channel 322-1 can be a web-based connection between the remote controller device 120-1 and the remote server 250. As previously discussed, the remote controller device 120 can include a touch-sensing surface 130 to input control commands from user 280-1 such as a subscriber.

Note that the remote controller device 120 can include additional transducer interfaces such as a microphone to receive spoken input from a respective user. In such an instance, the remote controller device 120 receives the spoken input and forwards the spoken input (or commands derived from translating the spoken input) over communication channel 322-1 to control the content management device 240 and/or display device 230.

The communication channel 322-1 can include a wireless portion and a hardwired portion. For example, by way of a non-limiting example, the portion of the communication channel 322-1 between the remote controller device 120-1 and the network interface 212-1 can be a wireless link, affording the user 208-1 mobility within the subscriber domain 260-1. Signals 170 can include control information transmitted to the network interface 212-1. The network interface 212-1 in the subscriber domain 260-1 transmits the control information to remote server 250.

In accordance with further embodiments, the content management device 240-1 can be configured to establish a communication session with a remote server over network 290-2. More specifically, the navigation application 210 can be configured to establish a communication session (e.g., communication channel 322-2 such as a web-based connection) between the navigation application 210 and server 250.

As further described herein, the navigation application 210 (e.g., content management device 240-1) can be configured to retrieve the control information 105 (and/or translated commands) as stored in remote server 250 over a link such as communication channel 322-2.

By way of a non-limiting example, the navigation application 210 can be configured to receive and translate the control information 105 into one or more respective commands to control settings of the content management device 240-1 or other target device in subscriber domain 260-1.

If desired, as an alternative embodiment, the remote server 250 can be configured to perform the translation of the control information 105 into one or more commands. In such an instance, the translated control information can be forwarded from the remote server 250 to the navigation application 210 in the content management device 240.

In accordance with yet another alternative embodiment, processing in the remote controller device 120 can be configured to translate the raw information received from the touch-sensing surface 130 into one or more commands understood by the content management device 240. In such an instance, the control information 105 can include the commands to be executed by the content management device 240.

Thus, translation can be performed in any suitable resource.

Note that the content management device 240-1 and/or display device 230 may initially be set to an OFF or standby mode. The user 208-1 can provide appropriate input to the touch-sensing surface 130 to activate the content management device 130. For example, the remote controller device 120 can receive input (e.g., a tap) from the user 208-1 to activate the content management device 240. In such an instance, the remote controller device 120 transmits the control information to the remote server 250. The remote server 250 forwards the command (e.g., turn-on command) to the navigation application 210 executing in the content management device 240-1. In this way, the remote controller device 120 can be used to control an ON/OFF/STANDBY state of the content management device 240 and/or display device 230.

In accordance with further embodiments, the user 208-1 can register his remote controller device 120-1 with the server 250 as being associated with subscriber domain 260-1. The remote server 250 can have access to registry information indicating the different content management devices in subscriber domain 260-1. In such an instance, upon use and detection of establishing communication channel 322-1, the remote server 250 can request the user 208-1 to identify which of multiple possible target devices in the subscriber domain 260-1 that the user 208-1 would like to control with the remote controller device 120-1.

In this example, assume that the user 208-1 inputs a set one or more gestures will be used to control content management device 240-1. The remote server 250 at least temporarily stores the control information 105. In a manner as previously discussed, the navigation application 210 communicates with the remote server 250 to initiate retrieval of the control information produced by the remote controller device 120-1. Based on the received control information 105 (e.g., translated or un-translated commands), the navigation application 210 initiates control of the content management device 240-1.

In one embodiment, in accordance with the translated control information such as one or more commands, the navigation application 210 tunes to a particular selected channel amongst multiple available channels 225. The content management device transmits or forwards the selected channel of streaming data as specified by the translated control information to a playback device 230 for playback. The content management device 240-1 can perform other functions such as storing selected content in a repository for later playback.

In a manner as discussed, the navigation application 210 can receive or retrieve control input from the remote controller device 120-1. Note that in a reverse direction, the navigation application 210 can be configured to transmit any suitable type of information such as state information, graphical user interface information, etc., over the communication channel 322-2 to the remote server 250. The remote server 250 can then forward the state information, graphical user interface information, etc., over communication channel 322-1 to the remote controller device 120-1.

As discussed below, the remote controller device 120-1 can be configured to receive the transmitted information and initiate display of appropriate graphics to the user 208-1.

One benefit of requiring inputted commands (e.g., touch input to the touch-sensing surface 130) to be transmitted in a manner as discussed herein is the ability of the remote server 250 to be a message broker.

Note that the message broker need not be remotely located with respect to the subscriber domain 240-1. As a possible alternative embodiment as discussed below, the broker functionality provided by the remote server 250 can be executed inside a respective home network environment or subscriber domain 260-1 such as in content management device 240-1 or any other suitable resource.

More particularly, in one embodiment, the broker functionality as discussed herein can execute on a shared set top box that serves up video to multiple IP set top boxes in the respective home environment. When the controlled application is a web application, due to limitations of the HTTP protocol, a message broker may be required. However, if the controlled application were implemented using a different technology, where it could support incoming network connections, it would be possible for the remote controller device 120-1 to communicate directly with the controlled application in the LAN environment (such as subscriber domain) without the need for a message broker.

In one non-limiting example embodiment, each of the communication channels 322-1 and 322-2 as shown in FIG. 2 can be secured links (e.g., via tunnels, encryption, etc.) on which to transmit information. The remote server 250 can ensure that the gesture-based input to the touch-sensing surface 130 of the remote controller device 120-1 is the only signal used to control the target device (e.g., content management device 240-1) in the subscriber domain 260-1. As previously discussed, in one embodiment, the navigation application 210 can be configured to repeatedly poll the remote server 250 to retrieve any newly available control information 105 inputted by the remote controller device 120-1. Alternatively, the remote server 250 can be configured to push (via a method such as reverse Ajax, W3C Server Sent Events (SSE), Web Sockets, etc.) the data (i.e., control information 105) to the navigation application 210 executing on the content management device 240. Thus, a subscriber in the subscriber domain 260-1 can enjoy uninterrupted service.

Each of the subscriber domains 260 can function in a similar manner as discussed above for subscriber domain 260-1. That is, a respective user in subscriber domain 260-2 can operate a respective remote controller device to control a content management device in the subscriber domain 260-2, and so on. The remote server 250 can manage the conveyance of respective control information for each subscriber domain in a similar manner as discussed above for subscriber domain 260-1. Thus, the remote server 250 can act as a communication broker for multiple subscribers that control target devices in their respective subscriber domains.

In yet further embodiments, note that the remote controller device 120-1 operated by the respective user 208-1 can be operated outside of the subscriber domain 260-1 to control the content management device 240-1 located in the subscriber domain 260-1. For example, the user 208-1 may connect to a WiFi base station at a location external to the subscriber domain 260-1. The remote controller device 120 can be configured to retrieve and display a set of control options to the user 208-1. Via input to the remote controller device 120-1 (which is located external to the subscriber domain 260-1), the user 208-1 is able to control the content management device 240-1 in a manner as previously discussed.

Figure 3:
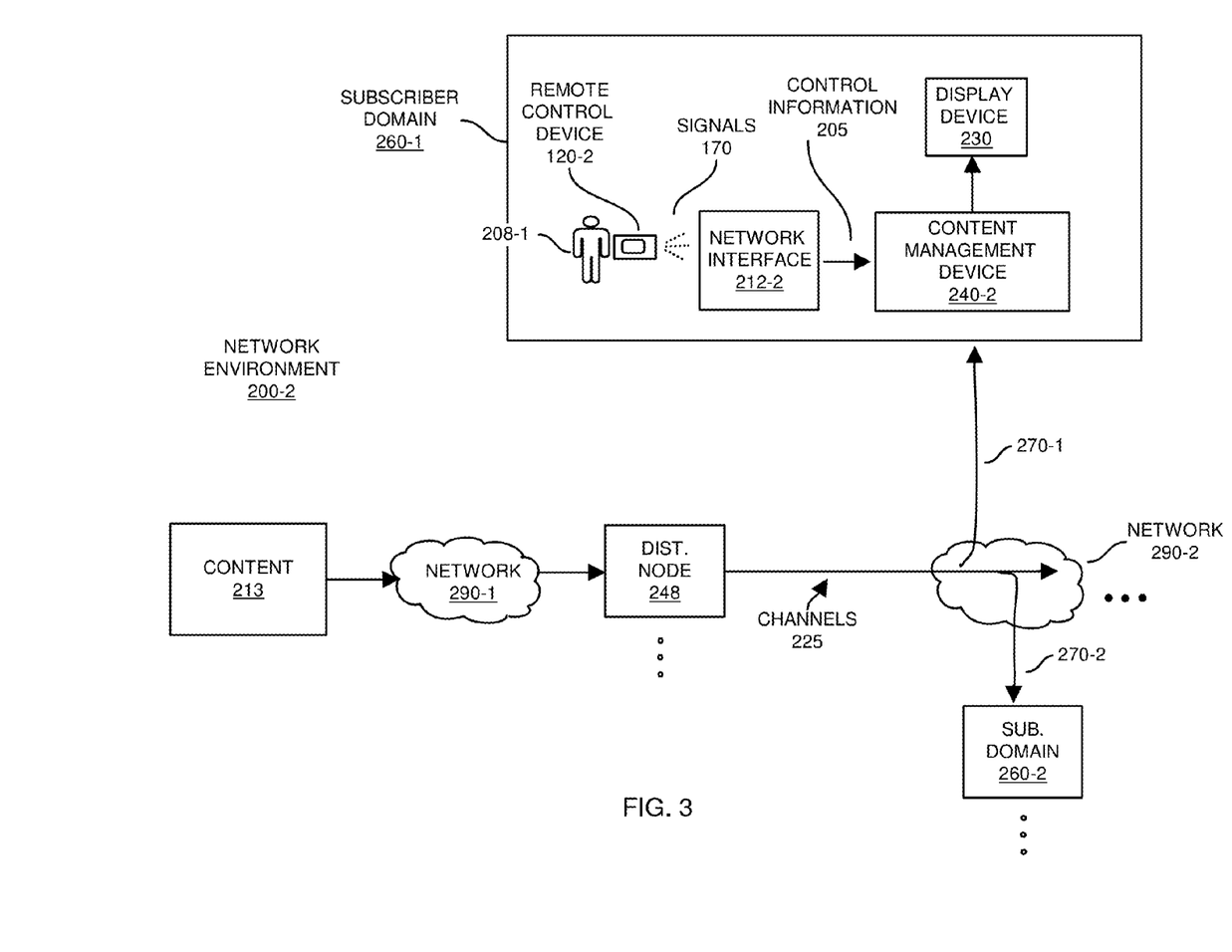
FIG. 3 is an example diagram illustrating a network environment in which a user operates a remote controller device to control a content management device according to embodiments herein.

FIG. 3 is an example diagram illustrating a network environment in which a user operates a remote controller device to control a content management device according to embodiments herein.

In this example, the content management device 240-2 receives content 213 transmitted over channels 225. However, in lieu of forwarding control information to a remote server 250, this embodiment includes transmitting the control information 105 from remote controller device 120-2 to the network interface 212-2; the network interface 212-2, in turn, forwards the control information 105 directly to content management device 240-2 for processing. Content management device 240-2 utilizes the received control information 105 as a basis to control its settings. Thus, as previously mentioned, broker functionality associated with the remote server 250 can be performed by an application in the content management device 240-1 or other suitable device internal or external to the subscriber domain 260-1.

Regardless of whether the control information 105 is sent directly to the content management device 240 for processing as discussed in FIG. 3 or through a broker such as remote server 250 as discussed in FIG. 2, the same gestures inputted to the remote controller device 120 can correspond to different types of commands depending on a state of the content management device 240-1 and/or display device 230.

For example, if the display device 230 is currently playing back content from a selected channel (to which the content management device 240-1 is tuned), a vertical swipe up gesture sensed by the touch-sensing surface 130 will cause the content management device 240-1 to tune to and playback the next higher channel. Conversely, a vertical swipe down gesture sensed by the touch-sensing surface 130 causes the content management device 240-1 to tune to and playback the next lower channel.

In accordance with one embodiment, the velocity of a swipe applied to the touch-sensing surface 130 of the remote controller device 120 can indicate a different type of command. For example, each successive slow swipe (e.g., finger speed between 0 and 5 inches per second) in an up direction inputted to the touch-sensing surface 130 can cause the content management device 240 to tune to and playback content from a next higher channel. Each successive slow swipe (e.g., finger speed such as between 0.5 and 2 inches per second) in an down direction (opposite the up direction) on the touch-sensing surface 130 can cause the content management device 240 to tune to and playback content from a next lower channel. On the other hand, a fast swipe up (e.g., a finger speed greater than a threshold value such as 2 inches per second) may cause the content management device 240 to display a graphical user interface to view available channels. The graphical user interface allows viewing and quick scrolling through a displayed menu of available channels without actually tuning to the different channels. Eventually, the user can provide a control gesture such as a tap input (or other suitable gesture) to select a particular channel from the displayed menu. The content management device 240 receives the command(s) specifying the selected channel and tunes to the selected channel.

In accordance with yet another embodiment, a user can touch the touch screen display device 430 for a predetermined amount of time to generate a command and notify the content management device 240-1 that the user would like to view a channel guide (e.g., channel numbers, time slots, and title of content available at the different times on the different channels) on the display device 230.

Subsequent to switching over to displaying the channel guide, the vertical swipe up and vertical swipe down commands may perform a different function than in the previous example (e.g., channel up and channel down) because the content management device 240-1 is set to a different mode (i.e., the channel guide mode). More specifically, while the content management device 240-1 displays the channel guide on the display device 230, the vertical swipe up inputted to the remote controller device 120 can cause the content management device 240-1 to scroll the channel guide down on the display device 230. Conversely, the vertical swipe down inputted to the remote controller device 120 can cause the content management device 240-1 to scroll the channel guide up on the display device 230. Accordingly, the same type of control gesture inputted to the remote controller device 120 can cause different types of functions in the content management device 240-1 depending on current settings of the content management device 240-1 and/or display device 230.

Thus, the content management device 240 can perform a different command to control settings of the content management device for a particular type of touch input to the touch screen depending on a state of controlling playback of content on the display device 230.

Figure 4:
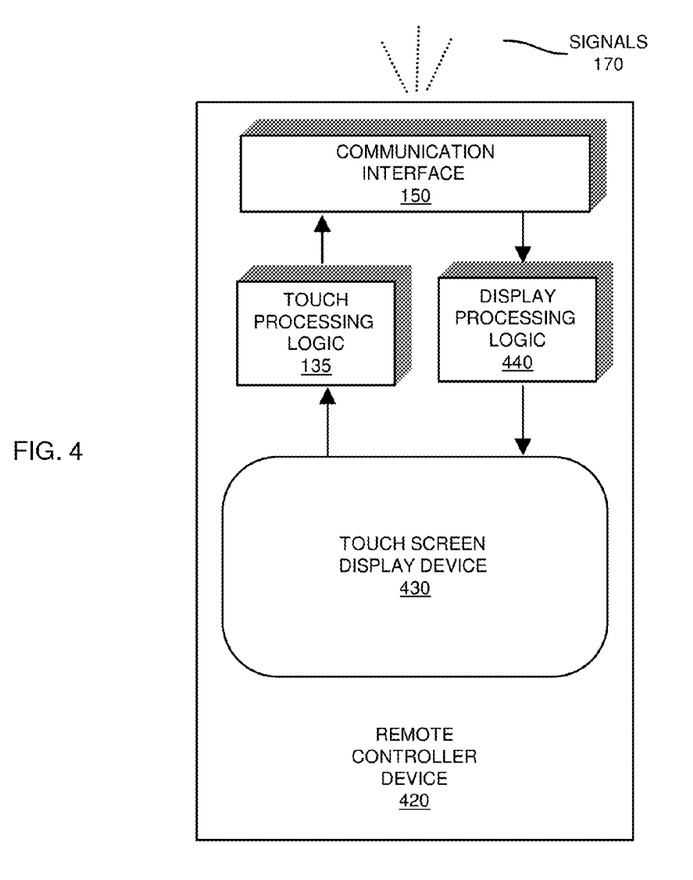
FIG. 4 is an example diagram illustrating a remote controller device including a touch screen display according to embodiments herein.

FIG. 4 is an example diagram illustrating a remote controller device including a touch screen according to embodiments herein.

By way of a non-limiting example, in addition to being configured to transmit control information from a respective user, the communication interface 150 of the remote controller device 120 can be configured to receive state information from the remote server 250 indicating a state of a resource in the subscriber domain such as the content management device 240-1 and/or display device 230. Any of the resources such as display device 230, content management device 240-1, remote server 250, etc., can generate the state information.

As shown, the touch-sensing surface of remote controller device 420 can be a touch screen display device 430. Thus, in addition to sensing touch input, the touch screen display device 430 can be used to display information for viewing by a respective user.

In one embodiment, the remote controller device 420 includes display-processing logic 440. The display-processing logic 440 can be configured to process the received state information and initiate display of custom information on the touch screen display device 430 depending on a respective state of the display device 230. The custom information (e.g., a graphical user interface) to display on the touch screen display device 430 can be generated locally by the remote controller device 420 or received from a remote resource such as from content management device 240-1, remote server 250, etc.

As an example, the display-processing logic 440 can receive notification that the user operating the remote controller device 420 would like to perform a search. In such an instance, the display-processing logic 440 can be configured to display a graphical user interface keyboard on the touch screen display device. Via sequential selection of different letters displayed in different regions of the touch screen display device 430, the user is able to enter text strings. The touch-processing logic 135 receives the text input and forwards this text control information to the remote server 250 and/or content management device 240-1 in any of the manners as previously discussed.

In accordance with further embodiments, note that the remote controller device 420 can include a microphone to receive audible input spoken by the user. The remote controller device 420 can include processing logic to convert the audible input into corresponding text. The audio processing logic can be configured to forward this corresponding control information such as text to the remote server 250 and/or content management device 240-1 in any of the manners as previously discussed. In accordance with further embodiments, if desired, the touch screen display device 430 can be configured to display a current state of the display device as well as, or alternatively, different options for controlling the content management device and/or display device.

In one embodiment, note that a gesture inputted to and detected by the remote controller device 420 can indicate selection of one or more commands displayed on the display device 230. For example, the content management device 240 can initiate display of a guide (e.g., graphical user interface) including display of one or more control options that are selectable by a subscriber viewing the display device 230. Via input such as one or more gestures to the touch screen display device 420, the user can select from a displayed list of one or more control options on the display device 230.

In alternative embodiments, note that the touch-sensing surface of the remote controller device 120 may not be populated with any selectable display symbols that are used to control the content management device 240. Even though no symbols are displayed of the touch screen display device 430, the touch input to the touch screen display device 430 can be translated into respective one or more commands to control the content management device 240 and/or display device 230.

As a specific non-limiting example, the display-processing logic 440 sets each pixel in the touch screen display device 430 to a common color setting to indicate to the user that the touch screen display device 430 is in an ON state. In accordance with another non-limiting example embodiment, the display-processing logic 440 sets each pixel in the touch screen display device 430 to an OFF state such that no pixels are lit resulting a blank touch screen.

In yet further embodiments, if desired, display-processing logic 440 can initiate display of helpful information on the touch screen display device 430 to provide instructions as to how to use the remote controller device 120 to control the content management device. The instructions displayed on the touch screen display device 430 can indicate what functions can currently be inputted to the touch screen display device 430 to control the content management device 240 and/or display device 230.

In still further embodiments, if desired, display-processing logic 440 can initiate display of symbols, graphics, etc., on the touch screen display device 430 that indicate how the user can control different aspects the content management device 240. Via input with respect to the graphics on the touch screen display device 430, the user is able to view a listing of available commands and provide input indicating how to control the content management device 240.

Figure 5:
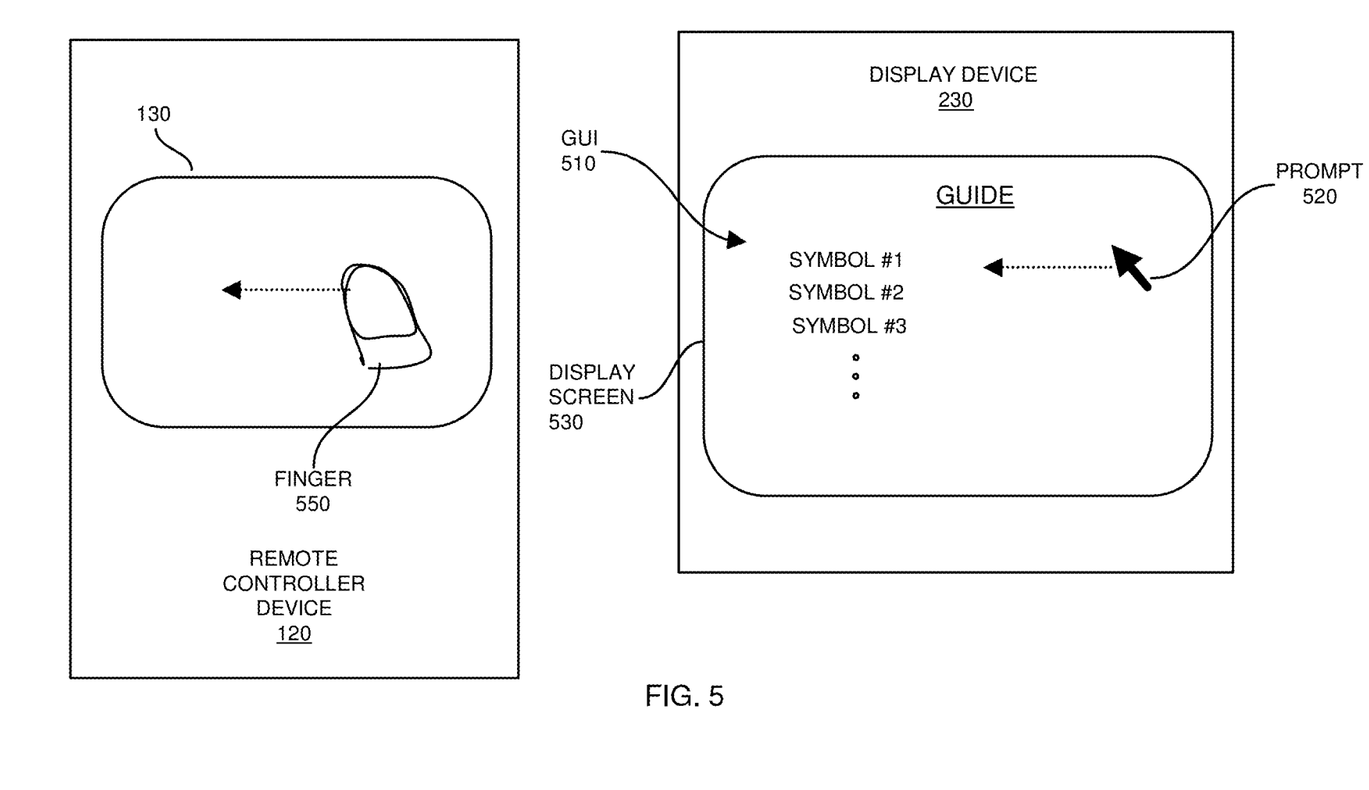
FIG. 5 is an example diagram illustrating control of a graphical user interface via a remote controller device according to embodiments herein.

FIG. 5 is an example diagram illustrating remote control according to embodiments herein.

In this example embodiment, the remote controller device 120 can be used to make selection of one or more symbols displayed on the display device 230 even though no corresponding symbol is displayed on the touch-sensing surface 130. In this example embodiment, assume that the touch-sensing surface 130 does not include a display of any selectable symbols as mentioned in a previously described embodiment. Instead, assume that the display device 230 displays selectable symbols (e.g., symbol #1, symbol #2, symbol #3, etc.) as shown.

In addition to display of selectable symbols, the display device 230 can be configured to display prompt 520. Content management device 240 or other suitable resource controls the display device 230 such that the displayed graphical user interface 510 on the display device 230 includes a rendering of prompt 520. Via input to the touch-sensing surface 130, the user is able to move and make selections of one or more symbols on the display device 230.

For example, in this example embodiment, to select the symbol #1, the user contacts the touch-sensing surface 130 with finger 550. While continuously touching the touch-sensing surface 130, the user steers his finger 550 about the touch-sensing surface 130. Movements of the finger 550 indicate how to move the prompt 520. Via transmission of the corresponding continuously inputted control information 105 in a manner as previously discussed, the remote controller device 120 notifies the content management device 240 how to move the prompt 520 on the display screen 530.

As a more specific example, to select a symbol such as symbol #1 on display screen 530, the user performs the left swipe to move the prompt 520 over the symbol #1 on the display screen 530. As mentioned, the finger 550 on touch-sensing surface 130 controls movement of the prompt 520. The user then discontinues touching the touch-sensing surface 130 after the prompt 520 rests over the symbol #1. To select or activate the symbol #1 (and corresponding command represented by symbol #1), the user provides further input to the touch-sensing surface 130 such as a tap, double tap, etc., to indicate selection of symbol #1.

In response to detection of the selection of the symbol #1 on the display screen 530, the content management device 240 initiates execution of the corresponding command associated with symbol #1. Execution of the corresponding selected command can cause the content management device 240 to initiate display of another graphical user interface on the display screen 530, playback selected content, etc. Via input and selection using prompt 520 in a similar manner, the user is able to view commands on display device 230 and make a corresponding selection of displayed commands.

Embodiments herein provide a unique way of controlling playback of content on a respective display device 230. For example, the touch-sensing surface 130 on the remote controller device 120 enables a respective user to make selection of commands displayed on the display screen 530 without having to use up, down, left, right arrow buttons on a conventional button press remote control device.

Figure 6:
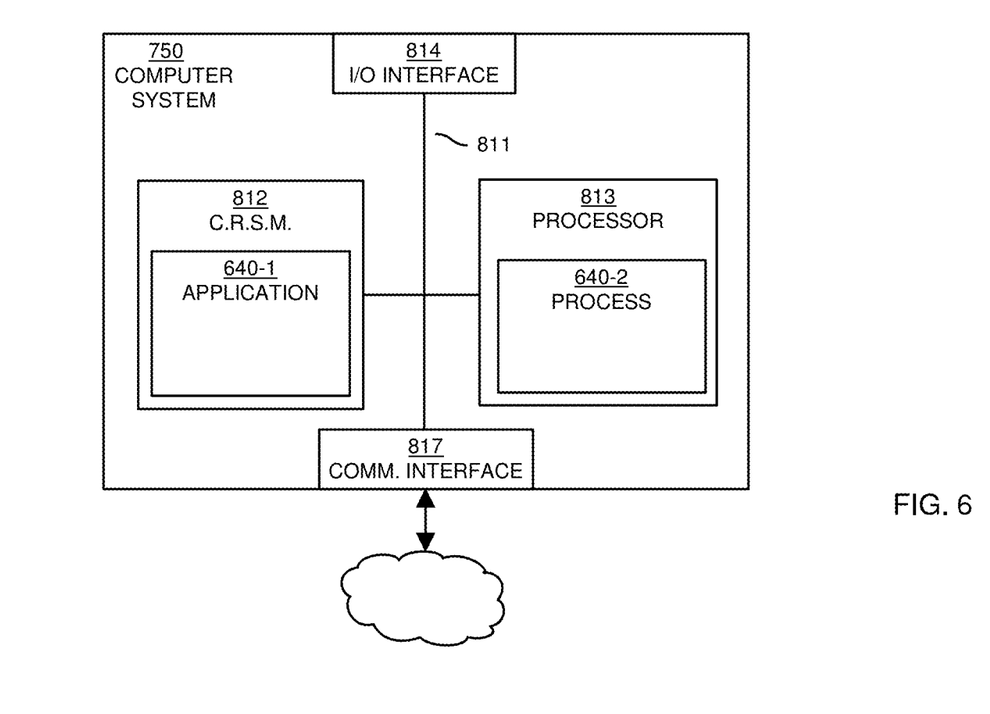
FIG. 6 is an example diagram illustrating a computer architecture in which to execute one or more embodiments as discussed herein.

FIG. 6 is an example block diagram of a computer system for implementing any of the operations as discussed herein according to embodiments herein.

Any of the resources (e.g., content management device 240, remote server 250, remote controller device 120, etc.) can be configured to include a processor and executable instructions to carry out the different operations as discussed herein.

As shown, computer system 750 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with application 640-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in application 640-1 stored on computer readable storage medium 812. Execution of the application 640-1 produces process 640-2 to carry out any of the operations and/or processes as discussed herein.

Those skilled in the art will understand that the computer system 750 can include other processes and/or software and hardware components, such as an operating system that controls allocation and use of hardware resources to application 640-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, any type of computing or electronic device, etc. The computer system 150 may reside at any location or can be included in any suitable resource in network environment 100 to implement functionality as discussed herein.

Functionality supported by the different resources will now be discussed via flowcharts in FIGS. 7-8. Note that the steps in the flowcharts below can be executed in any suitable order.

Figure 7:
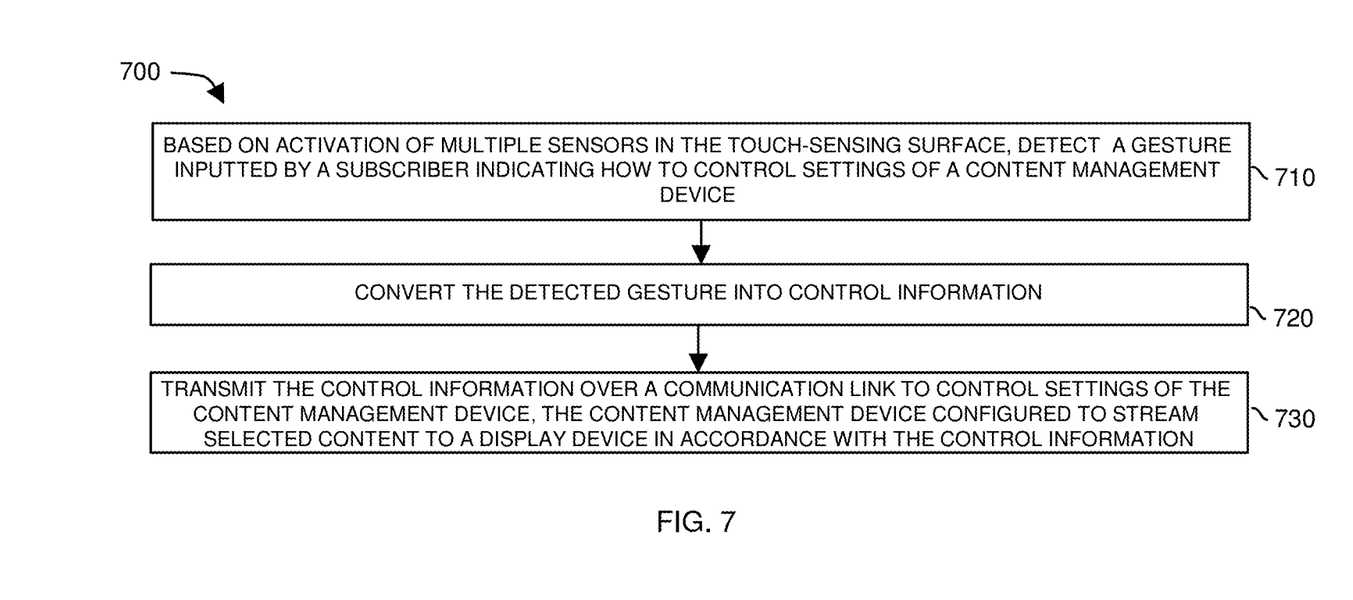
FIG. 7 is an example diagram illustrating a method of controlling a content management device using a remote controller device according to embodiments herein.

FIG. 7 is a flowchart 700 illustrating an example method according to embodiments. Note that there will be some overlap with respect to concepts as discussed above.

In processing block 710, based on activation of multiple sensors in the touch-sensing surface 130, the touch-sensing surface 130 detects a gesture inputted by a subscriber indicating how to control settings of a content management device 240.

In processing block 720, the touch-processing logic 135 converts and/or stores the detected gesture into control information 105.

In processing block 730, the communication interface 150 transmits the control information 105 over a communication link (e.g., communication channel 322-1) to control settings of the content management device 240. As previously discussed, the content management device 240 can be configured to stream selected content to a display device 230 in accordance with the control information 105.

Figure 8:
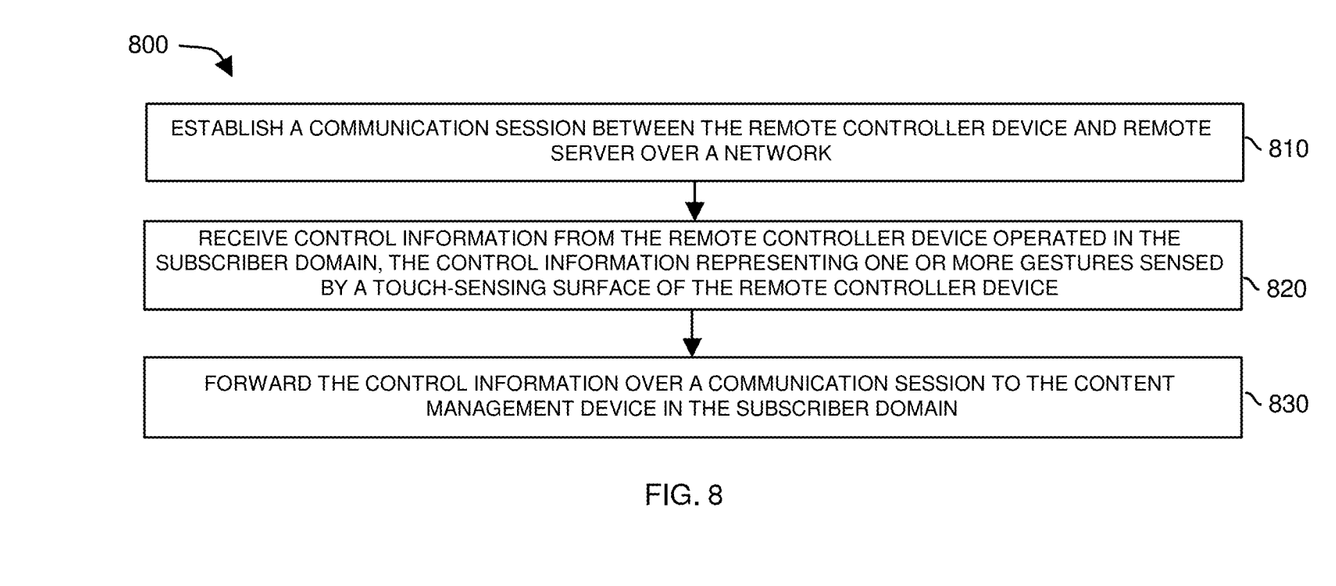
FIG. 8 is an example diagram illustrating a method of controlling a content management device using a remote controller device according to embodiments herein.

FIG. 8 is a flowchart 800 illustrating an example method according to embodiments. Note that there will be some overlap with respect to concepts as discussed above.

In processing block 810, the remote controller device 120 establishes a communication session (e.g., communication channel 322-1) between the remote controller device 120 and remote server 250 over a network.

In processing block 820, the remote server 250 receives control information 105 from the remote controller device 120-1 operated in the subscriber domain 260-1. The control information 105 can represent one or more gestures, commands, etc., sensed by a touch-sensing surface 130 of the remote controller device 120-1.

In processing block 830, the remote server 250 forwards the control information (e.g., translated or un-translated) over a communication session (e.g., communication channel 322-2) to the navigation application 210 in the content management device 240-1 in the subscriber domain.

Note again that techniques herein are well suited for remote control of a target device in a subscriber domain. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   establishing a communication session between a remote controller device in a subscriber domain and a remote server over a network;
   receiving control information from the remote controller device operated in the subscriber domain, the control information indicating a gesture sensed by a touch-sensing surface of the remote controller device;
   forwarding the control information over the communication session to the remote server to control a content management device in the subscriber domain;
   wherein the gesture is a swipe gesture, the method further comprising: utilizing a velocity of the swipe gesture to determine a command as indicated by the swipe gesture, the swipe gesture specifying a first command based when the velocity of the swipe command is above a threshold value, the swipe gesture specifying a second command when the velocity of the gesture is below the threshold value;
   responsive to detecting that the velocity of a first swipe gesture is above the threshold value: i) executing the first command, execution of the first command including initiating display of a graphical user interface on the remote controller device, the graphical user interface displaying multiple available channels, and ii) based on a tap input to a particular channel on the graphical user interface displayed on the touch-sensing surface, tuning to the particular channel selected from the graphical user interface; and
   responsive to detecting that the velocity of a second swipe gesture is below the threshold value, executing the second command, execution of the second command including tuning to a different channel than the current selected channel.

2. The method as in claim 1, wherein the content management device is a set-top box located in a subscriber domain of a shared cable network environment.

3. The method as in claim 1 further comprising:
establishing the communication session over a communication link between a navigation application executing on the content management device and the remote server, the navigation application being registered as a valid client for receiving the control information from the remote server.

4. The method as in claim 1 further comprising:
prior to detecting the gesture inputted by the subscriber indicating how to control settings of the content management device, calibrating an inputted swipe gesture to be a different number of pixels depending on size attributes of the touch-sensing surface.

5. The method as in claim 1, wherein tuning to the different channel than the current selected channel includes:
tuning to a next higher channel in response to detecting that the second swipe gesture is in a first direction; and
tuning to the next lower channel in response to detecting that the second swipe gesture is in a second direction, the second direction opposite the first direction.

6. A method comprising:
based on activation of multiple sensors in a touch-sensing surface of a remote controller device, detecting a gesture inputted by a subscriber indicating how to control settings of a content management device;
wherein the gesture is a swipe gesture, the method further comprising: utilizing a velocity of the swipe gesture to determine a command as indicated by the swipe gesture, the swipe gesture specifying a first command based when the velocity of the swipe command is above a threshold value, the swipe gesture specifying a second command when the velocity of the gesture is below the threshold value;
responsive to detecting that the velocity of a first swipe gesture is above the threshold value: i) executing the first command, execution of the first command including initiating display of a graphical user interface on the remote controller device, the graphical user interface displaying multiple available channels, and ii) based on a tap input to a particular channel on the graphical user interface displayed on the touch-sensing surface, tuning to the particular channel selected from the graphical user interface;
responsive to detecting that the velocity of a second swipe gesture is below the threshold value, executing the second command, execution of the second command including tuning to a different channel than the current selected channel;
converting the detected gesture into control information;
transmitting the control information over a communication link to control settings of the content management device, the content management device configured to stream selected content to a display device in accordance with the control information.

7. Computer-readable storage hardware having instructions stored thereon, the instructions, when carried out by a processing device, causes the processing device to perform operations of:
establishing a communication session between a remote controller device in a subscriber domain and a remote server over a network;
receiving control information from the remote controller device operated in the subscriber domain, the control information indicating a gesture sensed by a touch-sensing surface of the remote controller device;
forwarding the control information over the communication session to the remote server to control a content management device in the subscriber domain;
wherein the gesture is a swipe gesture, the instructions further comprising: utilizing a velocity of the swipe gesture to determine a command as indicated by the swipe gesture, the swipe gesture specifying a first command when the velocity of the swipe command is above a threshold value, the swipe gesture specifying a second command when the velocity of the gesture is below the threshold value;
responsive to detecting that the velocity of a first the swipe gesture is above the threshold value: i) executing the first command, execution of the first command including initiating display of a graphical user interface on the remote controller device, the graphical user interface displaying multiple available channels, and ii) based on a tap input to a particular channel on the graphical user interface displayed on the touch-sensing surface, tuning to the particular channel selected from the graphical user interface; and
responsive to detecting that the velocity of a second swipe gesture is below the threshold value, executing the second command, execution of the second command including tuning to a different channel than the current selected channel.

8. A system comprising:
computer processor hardware; and
a hardware storage resource coupled to the computer processor hardware, the hardware storage resource storing instructions that, when executed by the computer processor hardware, causes the computer processor hardware to perform operations of:
establishing a communication session between a remote controller device in a subscriber domain and a remote server over a network;
receiving control information from the remote controller device operated in the subscriber domain, the control information indicating a gesture sensed by a touch-sensing surface of the remote controller device;
forwarding the control information over the communication session to the remote server to control a content management device in the subscriber domain;
wherein the gesture is a swipe gesture, the system further comprising: utilizing a velocity of the swipe gesture to determine a command as indicated by the swipe gesture, the swipe gesture specifying a first command when the velocity of the swipe command is above a threshold value, the swipe gesture specifying a second command when the velocity of the gesture is below the threshold value;
responsive to detecting that the velocity of a first the swipe gesture is above the threshold value: i) executing the first command, execution of the first command including initiating display of a graphical user interface on the remote controller device, the graphical user interface displaying multiple available channels, and ii) based on a tap input to a particular channel on the graphical user interface displayed on the touch-sensing surface, tuning to the particular channel selected from the graphical user interface; and
responsive to detecting that the velocity of a second swipe gesture is below the threshold value, executing the second command, execution of the second command including tuning to a different channel than the current selected channel.

9. The system as in claim 8 further comprising:
establishing the communication session over a communication link between a navigation application executing on the content management device and the remote server, the navigation application being registered as a valid client for receiving the control information from the remote server.

10. The system as in claim 8, wherein tuning to the different channel than the current selected channel includes:
tuning to a next higher channel in response to detecting that the second swipe gesture is in a first direction; and
tuning to the next lower channel in response to detecting that the second swipe gesture is in a second direction, the second direction opposite the first direction.

\* \* \* \* \*